United States Patent
Wang et al.

(10) Patent No.: US 10,757,051 B2
(45) Date of Patent: Aug. 25, 2020

(54) INTEGRATING DIFFERENT MESSAGING APPLICATIONS WITHOUT RELYING ON MESSAGING PROTOCOLS

(71) Applicant: International Business Machines Corporation, Armonk, NY (US)

(72) Inventors: Der-Joung Wang, New Taipei (TW); Yi-Lin Tsai, Taichung (TW); Naomi Wu, Taipei (TW); Yang Liang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 15/912,100

(22) Filed: Mar. 5, 2018

(65) Prior Publication Data

US 2019/0273706 A1    Sep. 5, 2019

(51) Int. Cl.
*G06F 15/16*     (2006.01)
*H04L 12/58*     (2006.01)
*G06F 40/205*    (2020.01)
*G06F 3/0481*    (2013.01)

(52) U.S. Cl.
CPC .......... *H04L 51/066* (2013.01); *G06F 40/205* (2020.01); *G06F 3/0481* (2013.01)

(58) Field of Classification Search
CPC ... H04L 51/066; G06F 17/2705; G06F 3/0481
See application file for complete search history.

(56) References Cited

U.S. PATENT DOCUMENTS

| | | | |
|---|---|---|---|
| 7,023,979 B1* | 4/2006 | Wu | H04M 3/5233 379/265.11 |
| 8,949,714 B2 | 2/2015 | Park et al. | |
| 2004/0158582 A1* | 8/2004 | Takagi | H04L 67/325 |
| 2011/0289106 A1* | 11/2011 | Rankin, Jr. | G06Q 10/10 707/769 |
| 2011/0289161 A1* | 11/2011 | Rankin, Jr. | G06Q 10/107 709/206 |

(Continued)

FOREIGN PATENT DOCUMENTS

| | | |
|---|---|---|
| WO | 2008045811 A2 | 4/2008 |
| WO | 2008062251 A1 | 5/2008 |

(Continued)

OTHER PUBLICATIONS

Franz [Accessed Online Feb. 27, 2018] [http://meetfranz.com].

(Continued)

*Primary Examiner* — Sm A Rahman
(74) *Attorney, Agent, or Firm* — Patterson + Sheridan, LLP

(57) ABSTRACT

Performing an operation comprising receiving accessibility data generated by an operating system based on a first message outputted via a graphical user interface (GUI) of a first messaging client of a plurality of messaging clients executing on a device, extracting attributes of the first message from the received accessibility data and based on a first parsing rule, wherein the attributes comprise a text of the message, a sender of the message, and the first messaging client, and outputting for display an indication of the text of the message, the sender, and the first messaging client in a GUI of an integrated messaging application.

20 Claims, 11 Drawing Sheets

(56) References Cited

U.S. PATENT DOCUMENTS

| | | | |
|---|---|---|---|
| 2014/0122622 A1* | 5/2014 | Castera | H04L 51/32 |
| | | | 709/206 |
| 2016/0216947 A1 | 7/2016 | Hassibi et al. | |
| 2016/0227019 A1 | 8/2016 | Seol et al. | |

FOREIGN PATENT DOCUMENTS

| | | |
|---|---|---|
| WO | 2010025343 A1 | 3/2010 |
| WO | 2012170972 A2 | 12/2012 |

OTHER PUBLICATIONS

Rambox, [Accessed Online Feb. 27, 2018] [<https://www.fossmint.com/rambox-a-messaging-and-emailing-app-for-linux/>].

Andrew Godinez, "Combine WhatsApp, Facebook, & Other Messangers into One App," Dec. 23, 2015, [Accessed Online Feb. 27, 2017] [ : <https://android.gadgethacks.com/how-to/combine-whatsapp-facebook-other-messengers-into-one-app-0160827/>].

* cited by examiner

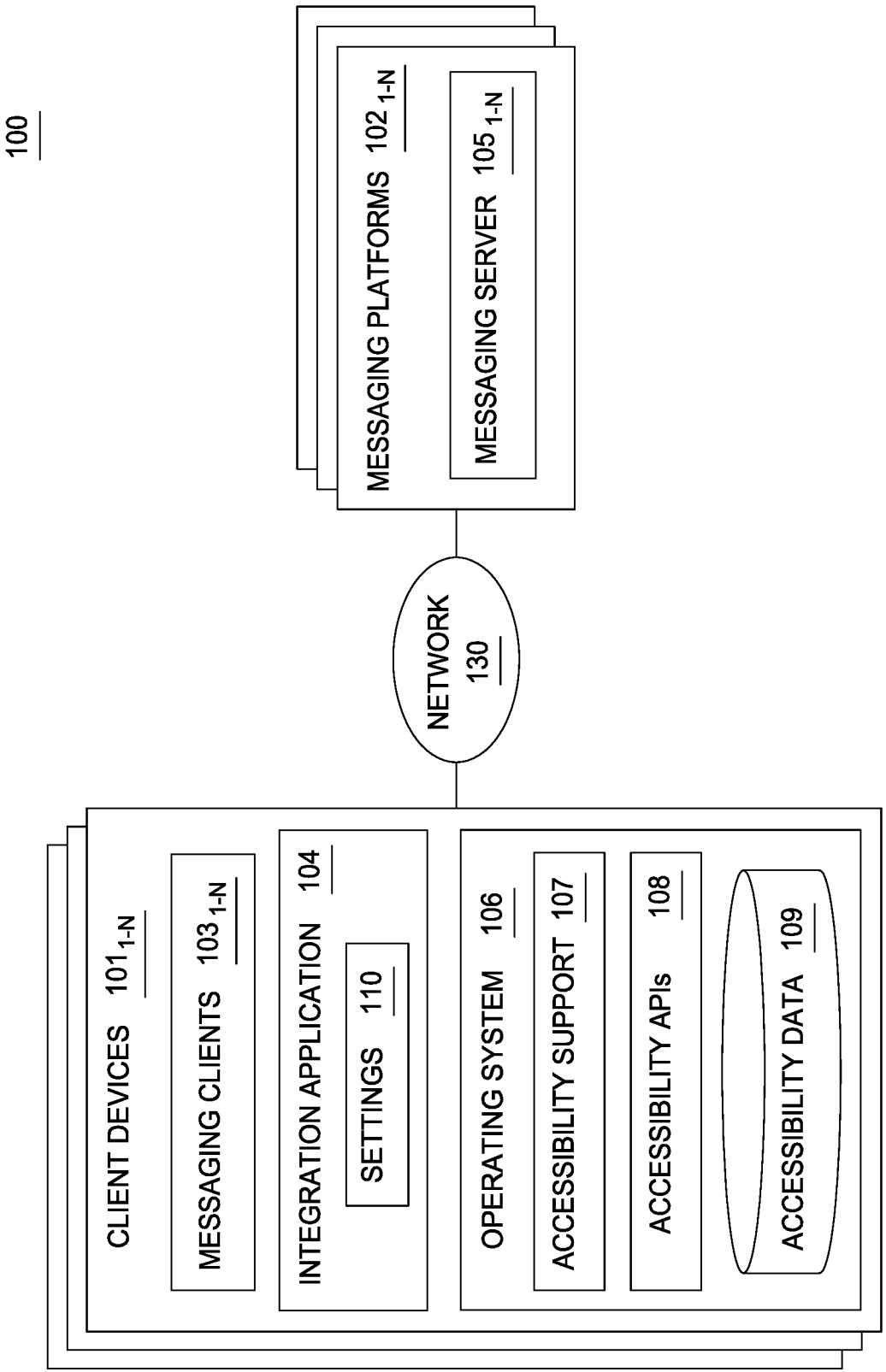

INTEGRATING DIFFERENT MESSAGING APPLICATIONS WITHOUT RELYING ON MESSAGING PROTOCOLS

BACKGROUND

The present invention relates to messaging applications, and more specifically, to integrating different messaging applications without relying on messaging protocols.

Internet messaging applications are used daily as part of corporate and personal life. However, the number and type of messaging applications require users to switch between each application manually, which can be time consuming and frustrating. Some conventional solutions have attempted to consolidate multiple messaging applications. However, these conventional solutions have focused on the specific networking protocols used by each messaging application. More specifically, these conventional solutions must recreate and support each specific networking protocol. Often, these networking protocols change, which means that the conventional solutions must also be updated to reflect the change in networking protocols. Furthermore, if the messaging protocol is encrypted, the associated messaging application cannot be included in conventional consolidation solutions.

SUMMARY

According to one embodiment of the present invention, a method comprises receiving accessibility data generated by an operating system based on a first message outputted via a graphical user interface (GUI) of a first messaging client of a plurality of messaging clients executing on a device, extracting attributes of the first message from the received accessibility data and based on a first parsing rule, wherein the attributes comprise a text of the message, a sender of the message, and the first messaging client, and outputting for display an indication of the text of the message, the sender, and the first messaging client in a GUI of an integrated messaging application.

In another embodiment, a system comprises a processor and a memory storing instructions, which when executed by the processor, performs an operation comprising receiving accessibility data generated by an operating system based on a first message outputted via a graphical user interface (GUI) of a first messaging client of a plurality of messaging clients executing on the system, extracting attributes of the first message from the received accessibility data and based on a first parsing rule, wherein the attributes comprise a text of the message, a sender of the message, and the first messaging client, and outputting for display an indication of the text of the message, the sender, and the first messaging client in a GUI of an integrated messaging application.

In another embodiment, a computer-readable storage medium has computer-readable program code embodied therewith, the computer-readable program code executable by a processor to perform an operation comprising receiving accessibility data generated by an operating system based on a first message outputted via a graphical user interface (GUI) of a first messaging client of a plurality of messaging clients executing on the processor, extracting attributes of the first message from the received accessibility data and based on a first parsing rule, wherein the attributes comprise a text of the message, a sender of the message, and the first messaging client, and outputting for display an indication of the text of the message, the sender, and the first messaging client in a GUI of an integrated messaging application.

BRIEF DESCRIPTION OF THE SEVERAL VIEWS OF THE DRAWINGS

FIG. 1 illustrates a system for integrating different messaging applications without relying on messaging protocols, according to one embodiment.

DETAILED DESCRIPTION

Figure 2A:
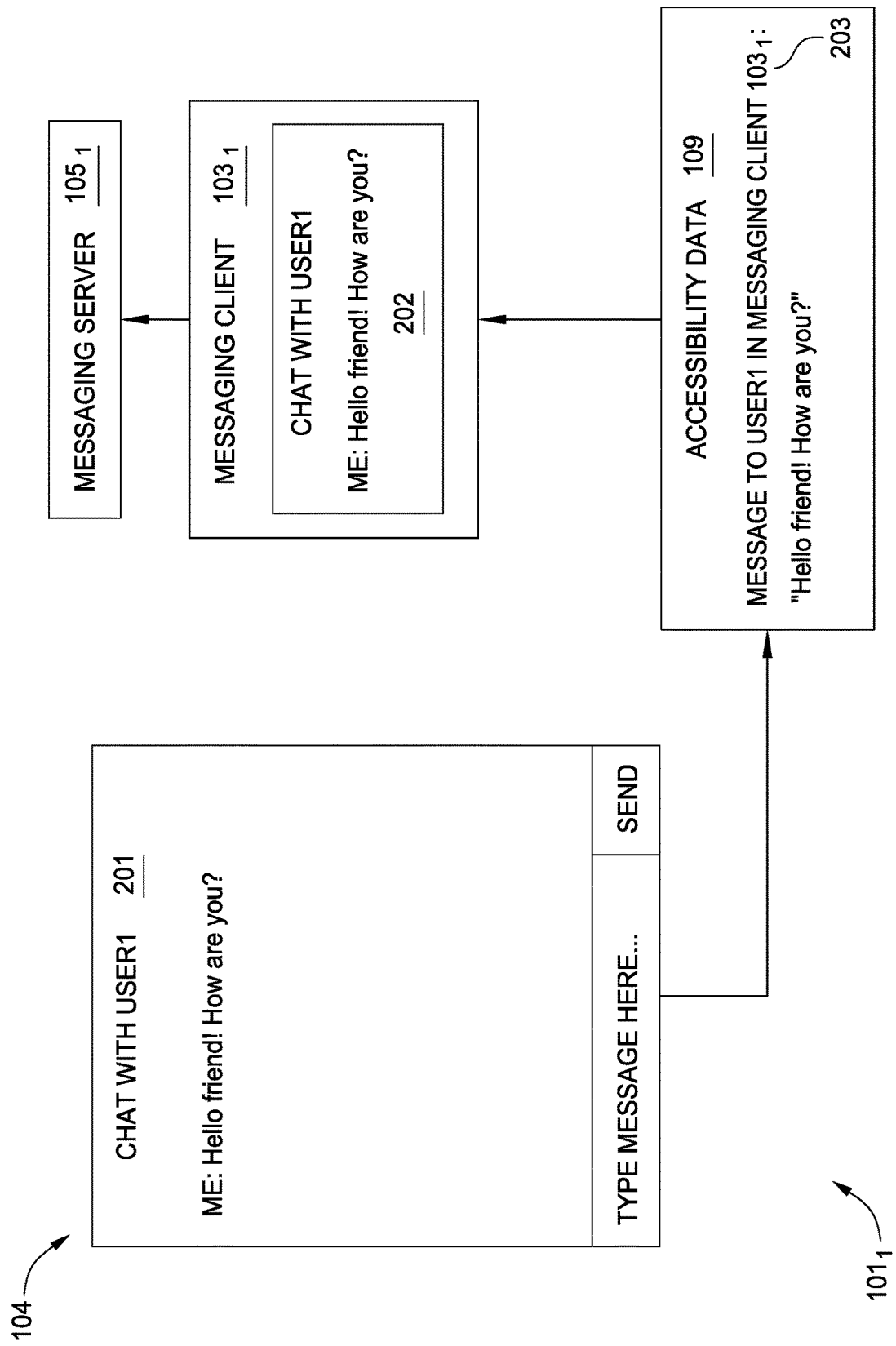
FIGS. 2A-2D illustrate techniques for integrating different messaging applications without relying on messaging protocols, according to one embodiment.

Embodiments disclosed herein provide a messaging application which integrates accounts and functionality of any number and type of messaging applications using operating system (OS) accessibility support. Generally, the integrated messaging application leverages the OS accessibility support to detect incoming messages from messaging applications, which are then displayed in a graphical user interface (GUI) of the integrated messaging application. Similarly, a user may compose messages in the GUI of the integrated messaging application. The integrated messaging application may then transmit the messages via the target messaging application to the recipient. Doing so improves the functionality of computing devices and messaging applications by not requiring knowledge of the underlying network protocols used by each specific messaging application.

FIG. 1 illustrates a system 100 for integrating different messaging applications without relying on messaging protocols, according to one embodiment. As shown, the system 100 includes a plurality of client devices $101_{1-N}$ and a plurality of messaging platforms $102_{1-N}$ communicably coupled via a network 130. The client devices $101_{1-N}$ are representative of any type of computing device, such as a smartphone, laptop computer, desktop computer, portable gaming console, and the like. The messaging platforms $102_{1-N}$ are representative of any type of networked messaging application that allows users to exchange messages, graphical objects, images, audio, and/or video. Example messaging platforms $102_{1-N}$ include, without limitation, Sametime® by IBM®, Facebook® Messenger, WhatsApp®, Skype®, and the like.

As shown, each client device $101_{1-N}$ includes one or more messaging clients $103_1$. N, an integration application 104, and an operating system 106. The operating system 106 (OS) generally controls the client device $101_{1-N}$. Examples of operating systems include the UNIX® operating system, versions of the Microsoft® Windows® operating system, and distributions of the Linux® operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.)

The messaging clients $103_{1-N}$ are representative of client applications provided by the respective messaging platforms $102_{1-N}$ (e.g., a client for communicating via IBM Sametime, etc.). Generally, users may communicate via the messaging clients $103_{1-N}$ executing on a respective client device $101_{1-N}$. For example, a user of messaging client $103_1$ executing on client device $101_1$ may transmit a message to a user of messaging client $103_1$ executing on client device $101_2$ via the messaging server $105_1$ of the messaging platform $102_1$. Generally, the messaging servers $105_{1-N}$ receive messages from transmitting users via the messaging clients $103_{1-N}$, and transmit the received message to the messaging client $103_{1-N}$ of the intended recipient(s). The messaging servers $105_{1-N}$ also provide additional functionality, such as message queuing, contact management, session management, authentication, notifications, etc.

The integration application 104 is an integrated messaging application which integrates two or more of the messaging clients $103_{1-N}$ on a given client device $101_{1-N}$. For example, a user may have accounts on messaging platforms $102_{1,2,N}$. Therefore, the user may use the integration application 104 to access their accounts on messaging platforms $102_{1,2,N}$ via a single application GUI. The credentials for each user account on the messaging platforms $102_{1-N}$ may be stored in the settings 110 of the integration application 104. Generally, the integration application 104 leverages the accessibility support 107 provided by the operating system 106. Accessibility support 107 is generally defined as technology which assists users who may experience difficulty using computing devices. Examples of accessibility support 107 technologies include screen readers (which audibly output a speech version of text on a display), text-to-speech algorithms, text-to-braille printers, speech-to-text algorithms, and the like.

Therefore, for example, if a user receives a message via the messaging client $103_1$, the accessibility support 107 of the OS 106 may capture the context of the messaging client $103_1$ in text format. The context may be stored in the accessibility data 109, which includes data generated by the accessibility support 107. The context of the messaging client $103_1$ may include, without limitation, an indication of the particular messaging client $103_1$, the associated messaging platform $102_1$, the user sending the message, the contents of the message, and a timestamp associated with the message. As such, the integration application 104 may receive the text context of the messaging client $103_1$ via the accessibility application programming interfaces (APIs) 108. The integration application 104 may parse the received text context based on one or more parsing rules for the messaging clients $103_{1-N}$ (and/or messaging platforms $102_{1-N}$) stored in the settings 110. The integration application 104 may then output an indication of the received message in a GUI for display.

Similarly, when a user of the integration application 104 composes and transmits a message, the integration application 104 ensures proper delivery of the message to the correct recipient. In one embodiment, the integration application 104 uses the accessibility APIs 108 to determine that a user has composed a message and entered an indication to transmit the message. As with the received message, the accessibility support 107 of the OS 106 creates a textual context of the integration application 104 when the user composes and specifies to transmit the message. The context of the integration application 104 may include a recipient of the composed message, the target messaging clients $103_{1-N}$ (and/or messaging platforms $102_{1-N}$), and the like. The integration application 104 may parse the received text context based on one or more parsing rules for the messaging clients $103_{1-N}$ (and/or messaging platforms $102_{1-N}$), text analytics, and/or natural language processing (NLP) algorithms stored in the settings 110. The integration application 104 may then recreate the message in the GUI of the messaging clients $103_{1-N}$ (or provide the message via an API of the messaging clients $103_{1-N}$ and/or the messaging platforms $102_{1-N}$), and transmit the message to the intended recipient via the messaging clients $103_{1-N}$. In at least one embodiment, the integration application 104 receives data describing sent and/or received messages directly from the APIs 108 of the accessibility support 107.

As stated, the integration application 104 leverages parsing rules (e.g., regular expressions), NLP algorithms, text analytics, and the like to process incoming and outgoing messages reflected by the generated accessibility data 109. Examples NLP algorithms and/or text analytics algorithms include parse tree generators, part of speech identifiers, tokenizers, classifiers, and the like. For example, based on a parse tree, the integration application may identify subjects, objects, and other parts of speech to extract the sender, recipient, and message text from accessibility data 109. Example parsing rules include regular expressions tailored to the accessibility data 109 generated for one or more messaging clients $103_{1-N}$ and/or messaging platforms $102_{1-N}$ that extract messages and/or message attributes therefrom. For example, if the accessibility data 109 generated for a received messages specifies "<username>-<messaging client>-<recipient>-<message>-<time>", the regular expression may extract the username, messaging client, recipient, message text, and the time from the accessibility data based on the known order of attributes and other delimiters (e.g., <, >, or - in this example).

FIG. 2A illustrates an example client device $101_1$ integrating different messaging applications without relying on messaging protocols, according to one embodiment. As shown, a GUI 201 of the integration application 104 depicts a messaging session between a user of the client device $101_1$ and an example user "User1". The user has specified to send a message "Hello friend! How are you?" to User1 via the GUI 201. As shown, the accessibility data 109 includes an indication 203 of the message composed via the integration application 104. In one embodiment, the integration application leverages parsing rules (e.g., a regular expression) and/or NLP algorithms in the settings 110 to parse the indication 203 of the message in the accessibility data 109. For example, the accessibility data 109 may include an indication of the sending user, intended recipient, the text of the message, and the target messaging client. The integration application 104 may use the parsing rules and/or NLP algorithms to extract the sending user (e.g., the local username), the intended recipient (e.g., "User1"), the text of the message (e.g., "Hello friend! How are you?"), and the target messaging client $103_1$ from the accessibility data 109. Based on the attributes extracted from the accessibility data 109, the integration application 104 recreates the message in the messaging client $103_1$, which transmitted to the messaging server $105_1$ for delivery to the intended recipient User1. In one embodiment, the integration application 104 transmits the message via an API of the messaging client $103_1$ and/or messaging server $105_1$. In another embodiment, the integration application 104 recreates the message in a GUI 202 of the messaging client $103_1$, and provides input to the messaging client $103_1$ specifying to transmit the message to the intended recipient(s).

In another embodiment, the integration application 104 directly determines the context of the GUI 201 to detect the composed message. For example, the integration application 104 may use the NLP algorithms, text analytics, and/or parsing rules to extract the message text, the intended recipient, the associated messaging client $103_1$ from the GUI 201, and transmit the message without requiring an API call to the accessibility APIs 108 to receive the accessibility data 109 and extract the attributes therefrom.

Figure 2B:
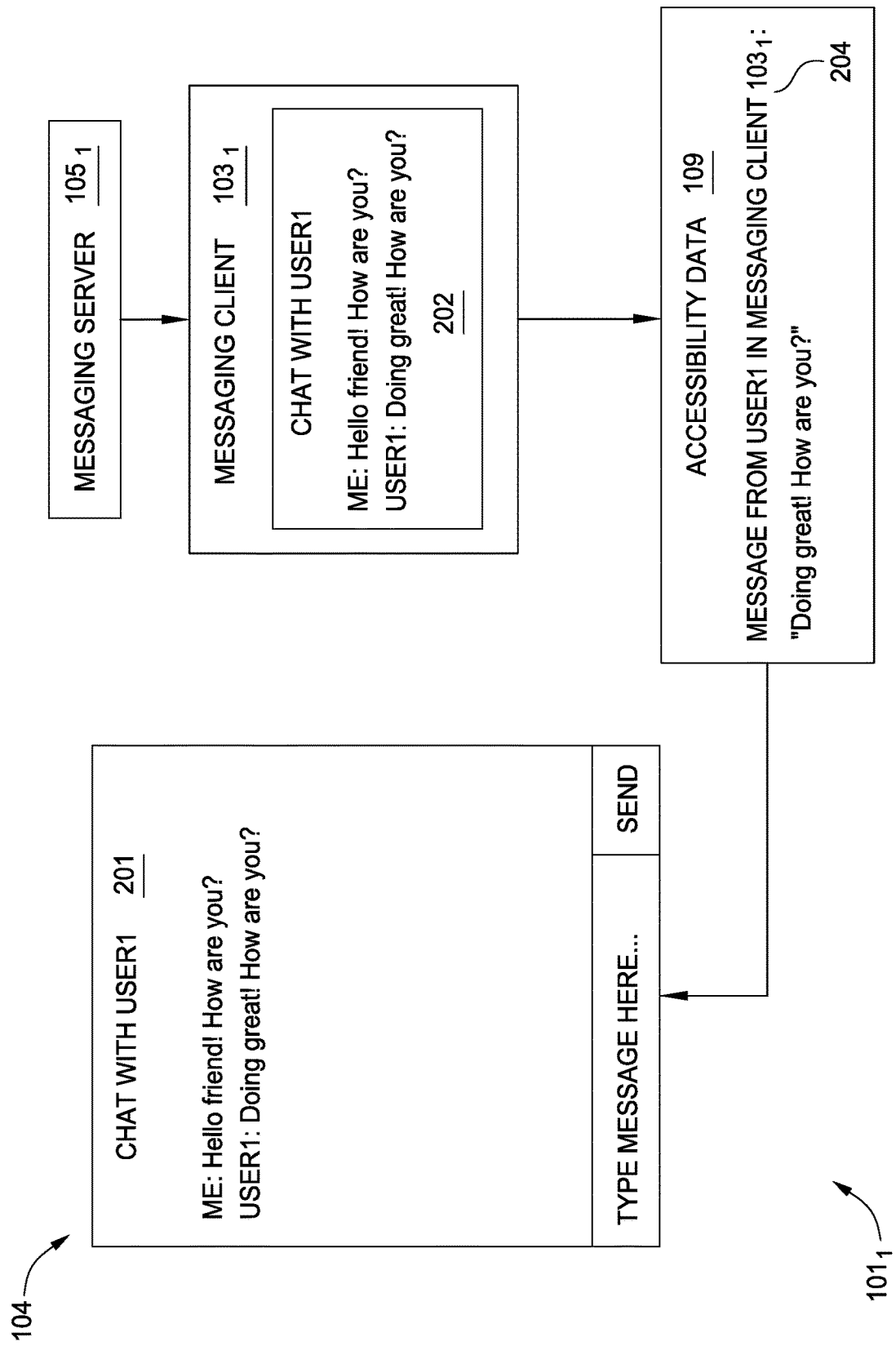

FIG. 2B depicts an embodiment where the messaging client $103_1$ has received a message from User1 via the messaging server $105_1$. As shown, the OS 106 accessibility support 107 has generated an entry 203 in the accessibility data 109 reflecting the received message depicted in the GUI 202 of messaging client $103_1$. The integration application 104 may periodically make API calls to the accessibility APIs 108, which returns the record 204 from the accessibility data 109. Once received, the integration application 104 parses and/or applies NLP algorithms to the text of the record 204, and outputs the message in the GUI 201. The integration application 104 may use the parsing rules, text analytics, and/or NLP algorithms to extract the sending user (e.g., "User1"), the intended recipient (e.g., the local username), the text of the message (e.g., "Doing great! How are you?"), and the messaging client $103_1$ from the record 204 of the accessibility data 109. If, for example, the user of the integration application 104 on the client device $101_1$ is chatting with another user, the integration application 104 may queue the message in a chat thread for User1, and output a notification that the message has been received. As another example, the integration application 104 may automatically modify the GUI 201 to depict the messaging thread with User1. The specific action taken by the integration application 104 may be based on a user-specified setting in the settings 110.

Figure 2C:
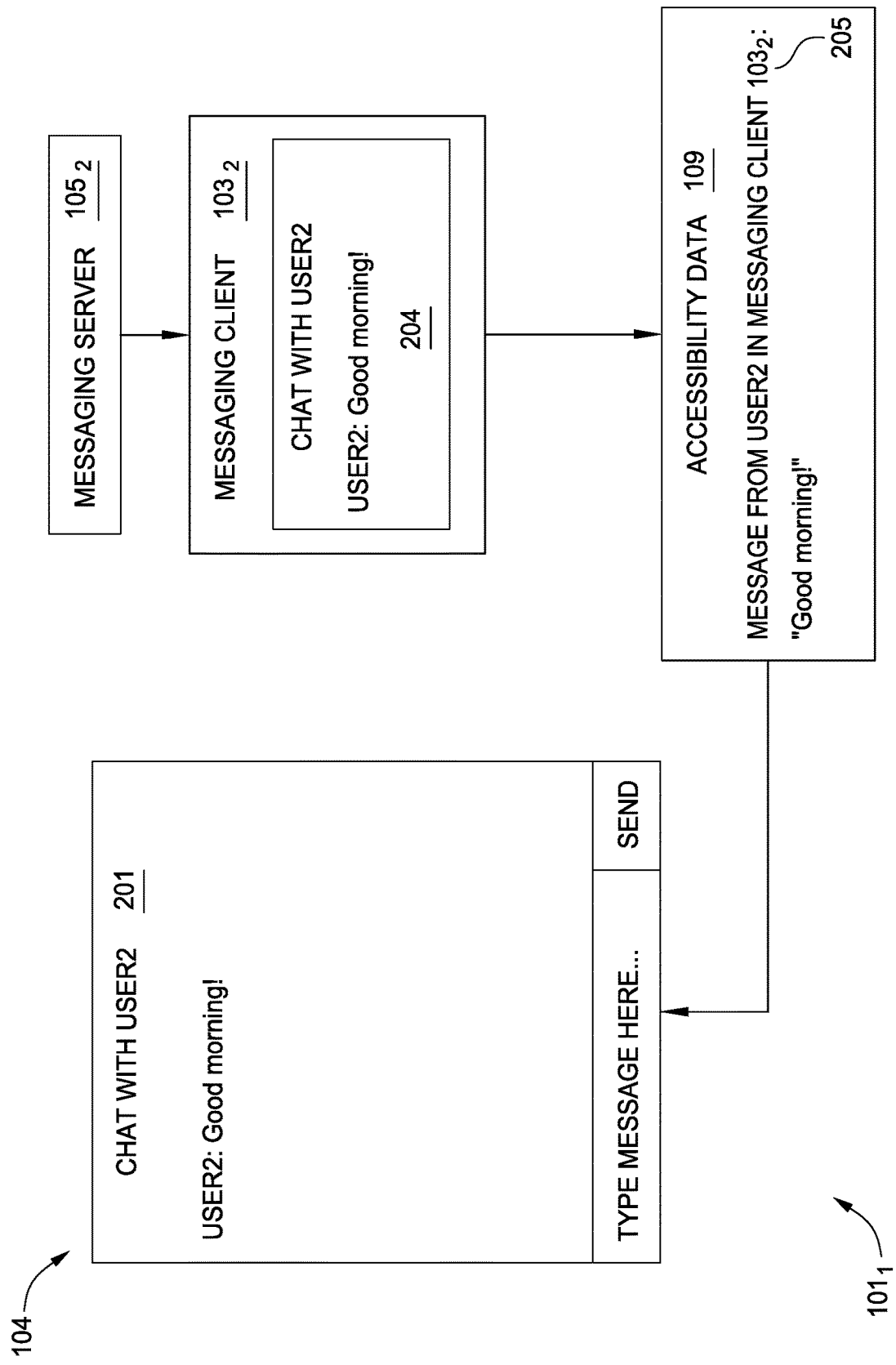

FIG. 2C depicts an embodiment where the messaging client $103_2$ executing on the client device $101_1$ has received a message from User2 via the messaging server $105_2$. As shown, the OS 106 accessibility support 107 has generated an entry 205 in the accessibility data 109 reflecting the received message depicted in the GUI 204 of messaging client $103_2$. The integration application 104 may make an API call to the accessibility APIs 108, which returns the record 205 from the accessibility data 109. Once received, the integration application 104 parses the text of the record 205 based on a parsing rule for messaging client $103_2$, and outputs the message in the GUI 201. For example, the integration application 104 may generate a parse tree from the record 205 of the accessibility data 109, and determine the sending user (e.g., "User2"), the intended recipient (e.g., the local user), the text of the message (e.g., "Good morning!"), and the messaging client $103_2$ based on the parse tree.

Figure 2D:
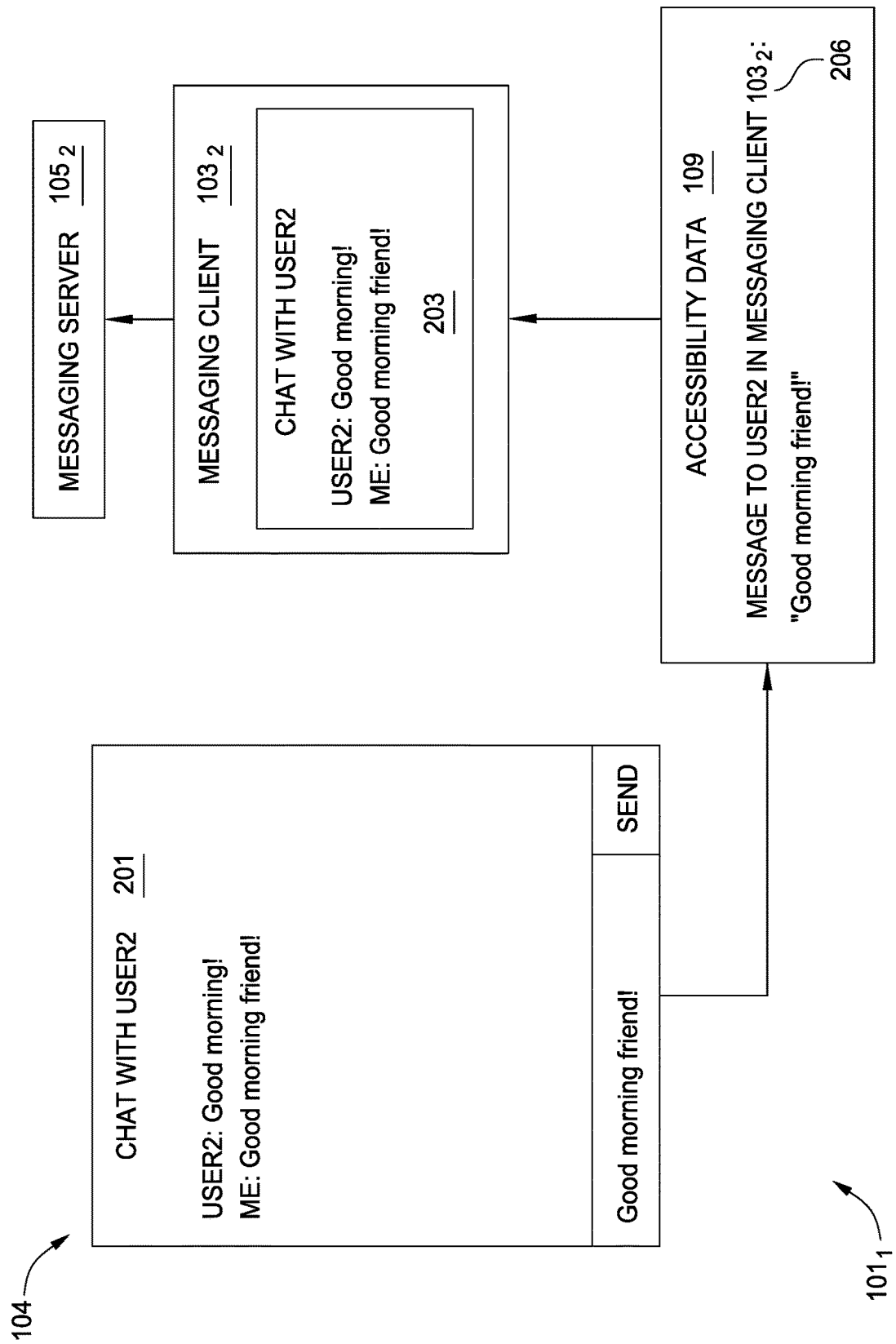

FIG. 2D depicts an embodiment where the user of client device $101_1$ has specified to send a message "Good morning friend!" to User2 via the GUI 201. As shown, the accessibility data 109 includes an indication 206 of the message composed via the integration application 104. In one embodiment, the accessibility data 109 further includes an indication that the user has clicked the send button of the GUI 201 (or pressed the enter key on a virtual and/or physical keyboard). In one embodiment, the integration application 104 leverages parsing rules (e.g., a regular expression), text analytics, and/or NLP algorithms in the settings 110 to parse the indication 203 of the message in the accessibility data 109 to determine the context of the message. Based on context determined from the accessibility data 109, the integration application 104 recreates the message in the messaging client $103_2$, which is transmitted to the messaging server $105_2$ for delivery to the intended recipient User2. In one embodiment, the integration application 104 transmits the message via an API of the messaging client $103_2$ and/or messaging server $105_2$. In another embodiment, the integration application 104 recreates the message in a GUI 203 of the messaging client $103_2$, and provides input to the messaging client $103_2$ specifying to transmit the message to the intended recipient(s).

Although FIGS. 2A-2D depict messages between two users, the disclosure is equally applicable to group chat sessions (e.g., messaging sessions between more than two users). In such embodiments, the integration application 104 makes API calls to the accessibility APIs 108 to receive incoming group messages, detect outgoing group messages, and transmit outgoing group messages to the recipients via the corresponding messaging client(s) $103_{1-N}$.

Advantageously, the integration application 104 supports messaging platforms $102_{1-N}$ and/or messaging clients $103_{1-N}$ which encrypt messages. When users compose messages via the integration application 104, indications of the unencrypted messages are recorded in the accessibility data 109. The integration application 104 may provide the indications to the corresponding messaging clients $103_{1-N}$, which may encrypt and transmit the messages accordingly. Similarly, the messaging clients $103_{1-N}$ decrypt encrypted messages, which are outputted via the GUI of the corresponding messaging client $103_{1-N}$. As such, the accessibility support 107 records an indication of the decrypted message in the accessibility data 109, which may then be outputted via the integration application 104. Furthermore, the integration application 104 supports messaging platforms $102_{1-N}$ and/or messaging clients $103_{1-N}$ without having to be aware of the respective networking protocols and other proprietary programming details.

Figure 3:
FIG. 3 illustrates a graphical user interface of an integration application which integrates different messaging applications without relying on messaging protocols, according to one embodiment.

FIG. 3 illustrates a more detailed GUI 300 of the integration application 104 executing on a client device $101_{1-N}$, according to one embodiment. As shown, the GUI 300 includes a chat window 301 which depicts a currently open chat session between the user and an example user "UserY" on example messaging platform A. The GUI 300 further includes a message composition field 302 where a user may provide text and/or graphical input. The user may send the message by pressing the enter key and/or pressing the send button 303. The GUI 300 further includes a contacts list 304 which specifies the different messaging platforms $102_{1-N}$ the user has authenticated with. The contacts list 304 further depicts contacts of the user on each platform $102_{1-N}$. The user may click on any username to cause output the associated chat thread in the chat window 301. Although not depicted, the integration application 104 further includes GUIs to authenticate on any number and/or type of messaging platforms $102_{1-N}$.

Figure 4:
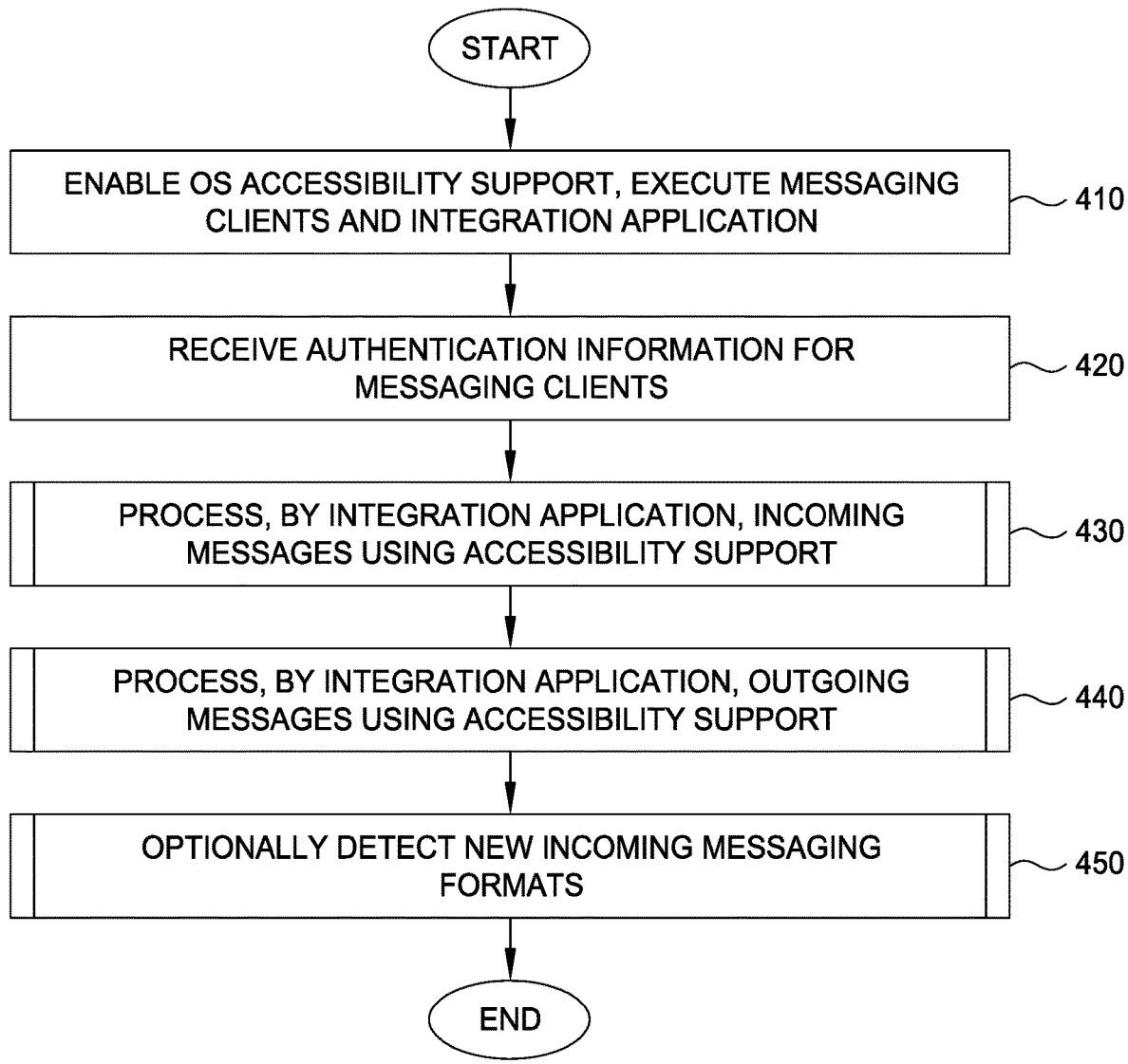
FIG. 4 is a flow chart illustrating a method to integrate different messaging applications without relying on messaging protocols, according to one embodiment.

FIG. 4 is a flow chart illustrating a method 400 to integrate different messaging applications without relying on messaging protocols, according to one embodiment. As shown, the method 400 begins at block 410, where a client device $101_{1-N}$ enables accessibility support 107 on the associated OS 106. Furthermore, the client device $101_{1-N}$ executes the integration application 104 and one or more messaging clients $103_{1-N}$. The messaging clients $103_{1-N}$ may execute in the background, while the integration application 104 and/or other applications execute in the foreground of the client device $101_{1-N}$. At block 420, the client device $101_{1-N}$ receives authentication information (e.g., user logins and passwords, or other credentials) for the executing messaging clients $103_{1-N}$ (if not already previously provided and stored).

At block 430, described in greater detail with reference to FIG. 5, the integration application 104 processes incoming messages using accessibility support 107. Generally, the integration application 104 receives incoming messages via the accessibility APIs 108 as they are received by the corresponding messaging client $103_{1-N}$. The integration application 104 then parses the accessibility data according to one or more parsing rules to extract the relevant attributes (which may include the message text) from each element of accessibility data, and output the messages via a GUI. At block 440, described in greater detail with reference to FIG. 6, the integration application 104 processes outgoing messages using accessibility support 107. Generally, the integration application 104 detects outgoing messages as they are composed via the GUI of the integration application 104 and/or via the accessibility data received from the accessibility APIs 108. The integration application 104 then parses the messages and/or accessibility data according to one or more parsing rules to extract the relevant attributes (which may include the message text), and transmit the message to the correct recipient via the messaging client $103_{1-N}$.

At block 450, described in greater detail with reference to FIG. 6, the integration application 104 optionally detects new incoming messaging formats in messages received from one or more messaging platforms $102_{1-N}$. Because the format of a given message and/or messaging client $103_{1-N}$ may change over time, the accessibility data 109 recorded by the accessibility support 107 may also change. However, the integration application 104 may dynamically detect these changes, and store new parsing rules for the messaging clients $103_{1-N}$ in the settings 110 accordingly. Doing so allows the integration application 104 to adapt to changes without requiring significant reprogramming.

Figure 5:
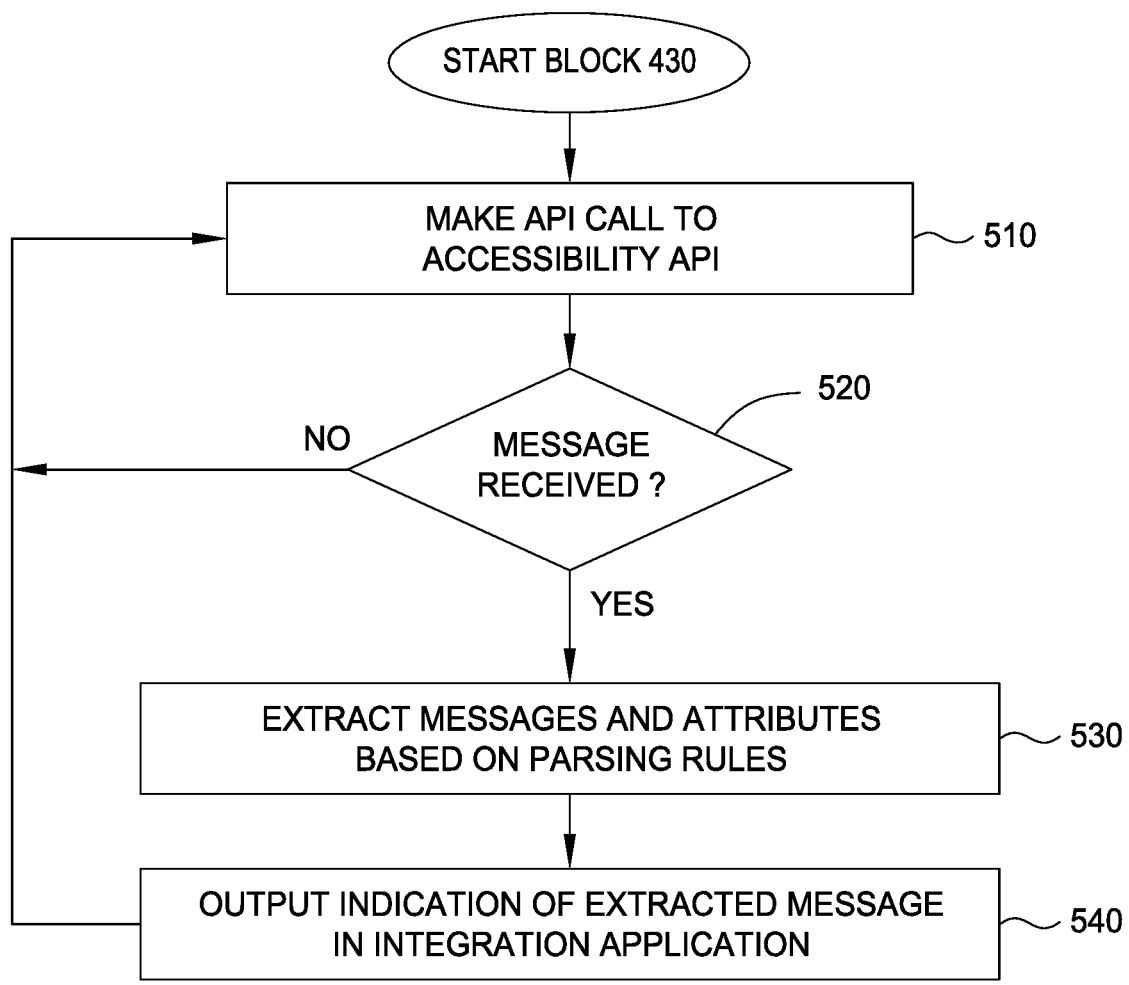
FIG. 5 is a flow chart illustrating a method process incoming messages using accessibility support, according to one embodiment.

FIG. 5 is a flow chart illustrating a method 500 corresponding to block 430 process incoming messages using accessibility support, according to one embodiment. As shown, the method 500 begins at block 510, where the integration application 104 makes an API call to the accessibility APIs 108. The API call may specify to return accessibility data 109 generated within a predefined period of time. At block 520, the integration application 104 determines whether the accessibility APIs 108 return accessibility data 109 which includes an indication of message(s) received via one or more messaging clients $103_{1-N}$. If a message is not received, the method returns to block 510. Otherwise, the method proceeds to block 530, where the integration application 104 extracts the message and any associated attributes from the accessibility data 109 received from the accessibility APIs 108. Generally, the integration application 104 may extract the message and associated attributes using parsing rules, regular expression, and/or NLP algorithms. The attributes may include a sender of the message, the corresponding messaging platform and/or client, a timestamp, the text of the message, and the like. At block 540, the integration application 104 outputs an indication of the extracted message in a GUI component of the integration application 104. The method 500 then returns to block 510.

Figure 6:
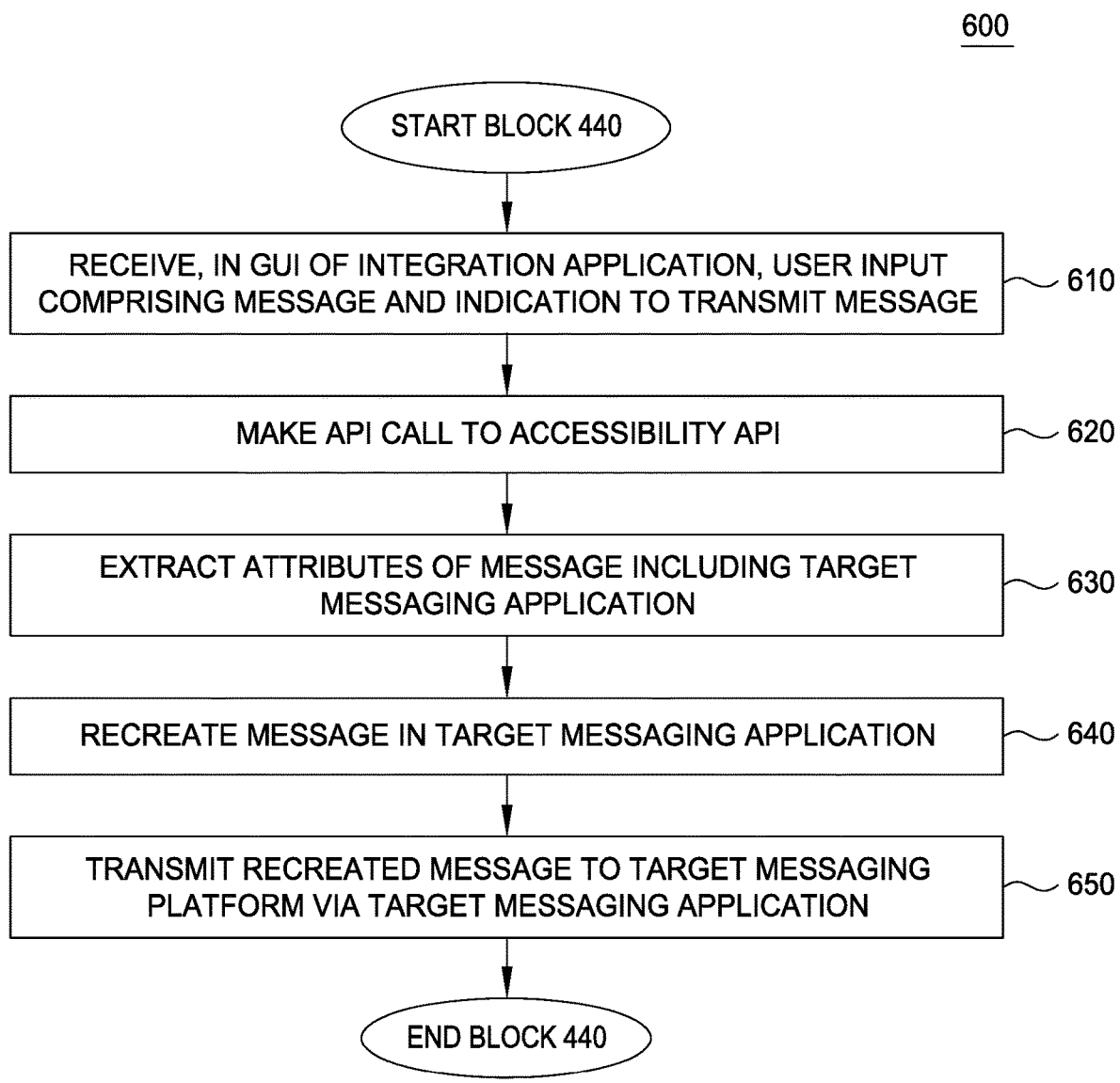
FIG. 6 is a flow chart illustrating a method to process outgoing messages using accessibility support, according to one embodiment.

FIG. 6 is a flow chart illustrating a method 600 corresponding to block 440 to process outgoing messages using accessibility support, according to one embodiment. As shown, the method 600 begins at block 610, where the GUI of the integration application 104 receives user input comprising a message and an indication to transmit the message to a recipient. The user input results in accessibility data 109 captured by the OS 106. At block 620, the integration application 104 makes an API call to the accessibility APIs 108. At block 630, the integration application 104 extracts the message and any associated attributes from the accessibility data 109 received from the accessibility APIs 108. Generally, the integration application 104 may extract the message and associated attributes using parsing rules, regular expression, and/or NLP algorithms. The attributes may include the sender of the message, the recipient of the message, the target messaging client $103_{1-N}$, a timestamp, and the like. At block 640, the integration application 104 recreates the message in the target messaging client $103_{1-N}$, including the message contents, the sender, and the recipient. At block 650, the integration application 104 causes the target messaging client $103_{1-N}$ to transmit the message to the recipient via the messaging server $105_{1-N}$ of the messaging platform $102_{1-N}$.

Figure 7:
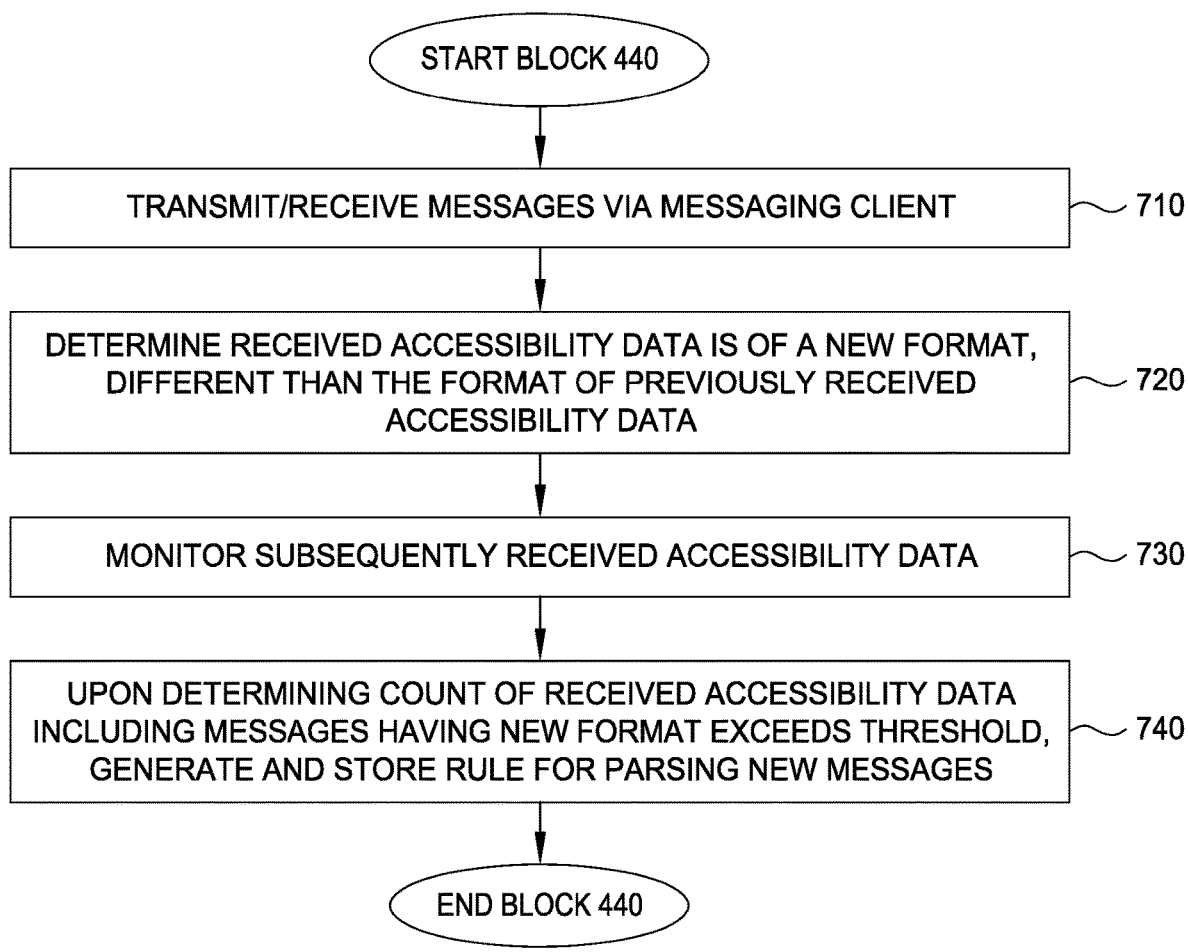
FIG. 7 is a flow chart illustrating a method to detect new incoming message formats, according to one embodiment.

FIG. 7 is a flow chart illustrating a method 700 corresponding to block 450 to detect new incoming message formats, according to one embodiment. As shown, the method 700 begins at block 710, where the messaging clients $103_{1-N}$ transmit and/or receive messages. At block 720, the integration application 104 receives the corresponding accessibility data 109 associated with each transmitted and/or received message, and determines that the format of at least one instance of received accessibility data 109 is different than the format of previously received instances of accessibility data 109 for the same messaging client $103_{1-N}$. At block 730, the integration application 104 monitors the format of subsequently received accessibility data 109. At block 740, the integration application 104 determines that the count of instances of accessibility data 109 having the different format identified at block 720 exceeds a threshold. As such, the integration application 104 determines that a change has occurred in the format of the messaging client $103_{1-N}$, the messaging platform $102_{1-N}$, or any other designated component thereof. The integration application 104 may then generate a new rule for parsing messages from the corresponding messaging client $103_{1-N}$ and/or the messaging platform $102_{1-N}$, which may be stored in the settings 110. In one embodiment, to generate the new rule, the integration application 104 may generate a plurality of different regular expressions which are applied to the new format of the accessibility data 109. Once a regular expression(s) is determined to correctly parse the accessibility data 109, the integration application 104 stores the regular expression in the settings 110 with an indication of the corresponding messaging client $103_{1-N}$ and/or the messaging platform $102_{1-N}$.

Figure 8:
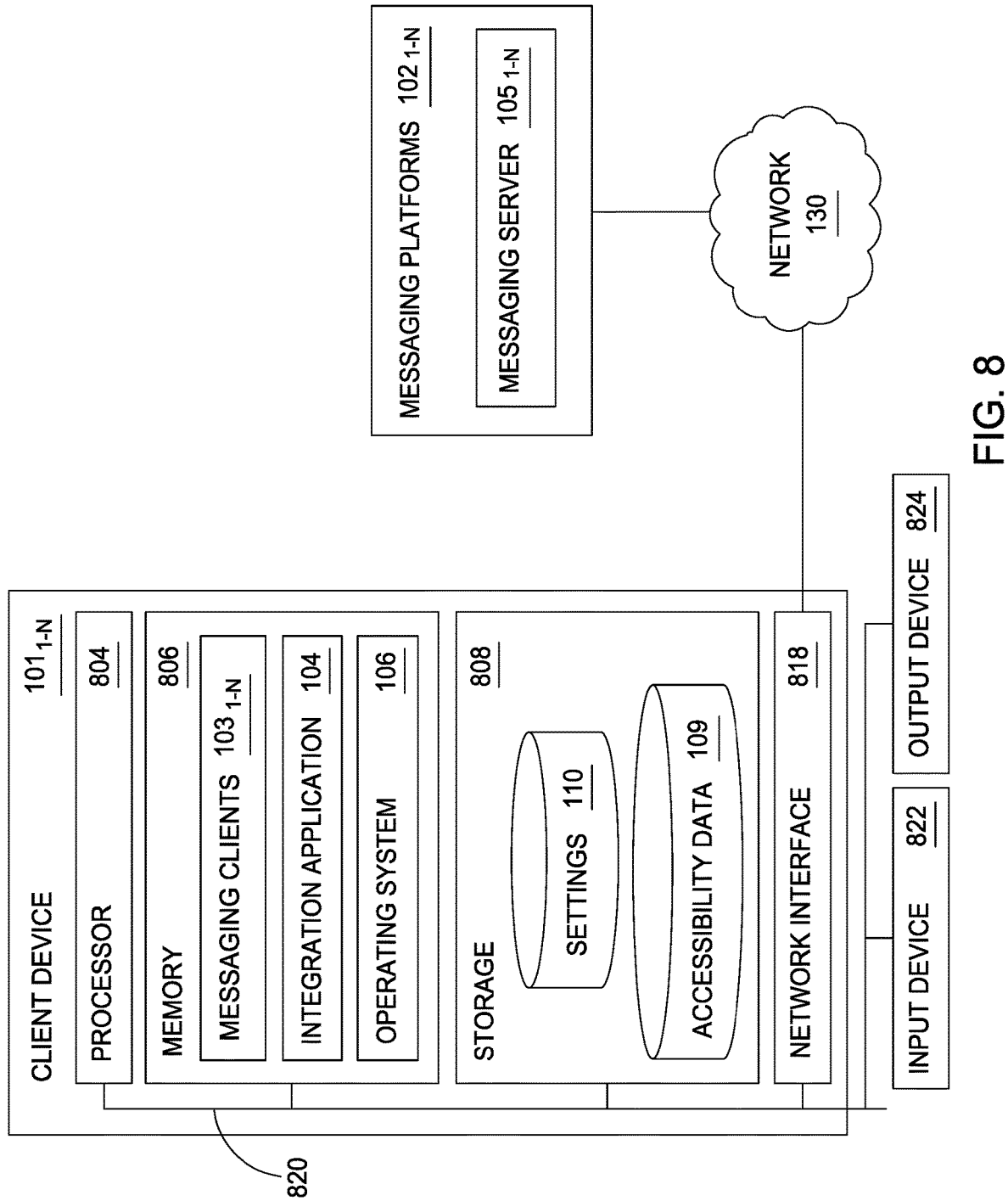
FIG. 8 illustrates a system which integrates different messaging applications without relying on messaging protocols, according to one embodiment.

FIG. 8 illustrates a system 800 which integrates different messaging applications without relying on messaging protocols, according to one embodiment. The networked system 800 includes an example computing device $101_{1-N}$. The computing device $101_{1-N}$ may also be connected to other computing devices via the network 130. In general, the network 130 may be a telecommunications network and/or a wide area network (WAN). In a particular embodiment, the network 130 is the Internet.

The computing device $101_{1-N}$ generally includes a processor 804 which obtains instructions and data via a bus 820 from a memory 806 and/or a storage 808. The computing device 101$_{1-N}$ may also include one or more network interface devices 818, input devices 822, and output devices 824 connected to the bus 820. The computing device 101$_{1-N}$ is generally under the control of an operating system 106. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 804 is a programmable logic device that performs instruction, logic, and mathematical processing, and may be representative of one or more CPUs. The network interface device 818 may be any type of network communications device allowing the computing device 101$_{1-N}$ to communicate with other computing devices via the network 130.

The storage 808 is representative of hard-disk drives, solid state drives, flash memory devices, optical media and the like. Generally, the storage 808 stores application programs and data for use by the computing device 101. In addition, the memory 806 and the storage 808 may be considered to include memory physically located elsewhere; for example, on another computer coupled to the computing device 101 via the bus 820.

The input device 822 may be any device for providing input to the computing device 101. For example, a keyboard and/or a mouse may be used. The input device 822 represents a wide variety of input devices, including keyboards, mice, controllers, and so on. Furthermore, the input device 822 may include a set of buttons, switches or other physical device mechanisms for controlling the computing device 101. The output device 824 may include output devices such as monitors, touch screen displays, and so on.

As shown, the memory 806 contains the messaging clients 103$_{1-N}$, the integration application 104, and the operating system 106, each described in greater detail above. As shown, the storage includes the accessibility data 109 and the settings 110, each described in greater detail above. Generally, the system 800 is configured to implement all systems, methods, and functionality described above with reference to FIGS. 1-7.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference was made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   transmitting, to an operating system, a request for accessibility data generated by a screen reader within a predefined period of time;
   receiving, responsive to the request, accessibility data generated by the operating system, wherein the accessibility data was generated by the operating system by processing, using the screen reader, a first message outputted via a graphical user interface (GUI) of a first messaging client of a plurality of messaging clients executing on a device, wherein the first messaging client is executing in a background of the device;
   extracting attributes of the first message from the received accessibility data and based on a first parsing rule, wherein the attributes comprise a text of the message, a sender of the message, and the first messaging client; and
   outputting for display an indication of the text of the message, the sender, and the first messaging client in a GUI of an integrated messaging application, wherein the integrated messaging application is executing in a foreground of the device.

2. The method of claim 1, further comprising:
   receiving, via the GUI of the integrated messaging application, a second message directed to the sender of the first message;
   receiving, via the GUI of the integrated messaging application, input specifying to transmit the second message to the sender of the first message;
   receiving accessibility data generated by the operating system based on the second message and the input specifying to transmit the second message;
   extracting attributes of the second message from the received accessibility data for the second message and based on the first parsing rule; and
   transmitting, by the first messaging client, the second message to the sender of the first message.

3. The method of claim 2, further comprising prior to transmitting the second message:
   recreating the second message in the GUI of the first messaging client; and
   causing the first messaging client to transmit the recreated second message to the sender of the first message.

4. The method of claim 1, further comprising:
   determining a format of the accessibility data received based on a second message outputted via the GUI of the first messaging client is different that a format of the accessibility data received based on the first message outputted via the GUI of the first messaging client;
   generating a second parsing rule based on the different format of the accessibility data; and storing an indication to parse accessibility data received based on messages received via the first messaging client using the second parsing rule.

5. The method of claim 1, further comprising:
receiving accessibility data generated by the operating system based on a second message outputted via a GUI of a second messaging client of the plurality of messaging clients executing on the device;
extracting attributes of the second message from the received accessibility data for the second message and based on a second parsing rule, wherein the attributes comprise a text of the second message, a sender of the second message, and the second messaging client; and
outputting for display an indication of the text of the second message, the sender of the second message, and the second messaging client in the GUI of the integrated messaging application.

6. The method of claim 5, further comprising:
receiving, via the GUI of the integrated messaging application, a third message directed to the sender of the second message;
receiving, via the GUI of the integrated messaging application, input specifying to transmit the third message to the sender of the second message;
receiving accessibility data generated by the operating system based on the third message and the input specifying to transmit the third message;
extracting attributes of the third message from the received accessibility data for the third message and based on the second parsing rule; and
transmitting, by the first messaging client, the third message to the sender of the second message.

7. The method of claim 1, wherein the accessibility data is received from an accessibility application programming interface (API) responsive to an API call generated by the integrated messaging application.

8. A system, comprising:
a processor; and
a memory containing a program which when executed by the processor performs an operation comprising:
transmitting, to an operating system, a request for accessibility data generated by a screen reader within a predefined period of time;
receiving, responsive to the request, accessibility data generated by the operating system, wherein the accessibility data was generated by the operating system by processing, using the screen reader, a first message outputted via a graphical user interface (GUI) of a first messaging client of a plurality of messaging clients executing on the system, wherein the first messaging client is executing in a background of the system;
extracting attributes of the first message from the received accessibility data and based on a first parsing rule, wherein the attributes comprise a text of the message, a sender of the message, and the first messaging client; and
outputting for display an indication of the text of the message, the sender, and the first messaging client in a GUI of an integrated messaging application, wherein the integrated messaging application is executing in a foreground of the system.

9. The system of claim 8, the operation further comprising:
receiving, via the GUI of the integrated messaging application, a second message directed to the sender of the first message;
receiving, via the GUI of the integrated messaging application, input specifying to transmit the second message to the sender of the first message;
receiving accessibility data generated by the operating system based on the second message and the input specifying to transmit the second message;
extracting attributes of the second message from the received accessibility data for the second message and based on the first parsing rule; and
transmitting, by the first messaging client, the second message to the sender of the first message.

10. The system of claim 9, the operation further comprising prior to transmitting the second message:
recreating the second message in the GUI of the first messaging client; and
causing the first messaging client to transmit the recreated second message to the sender of the first message.

11. The system of claim 8, the operation further comprising:
determining a format of the accessibility data received based on a second message outputted via the GUI of the first messaging client is different that a format of the accessibility data received based on the first message outputted via the GUI of the first messaging client;
generating a second parsing rule based on the different format of the accessibility data; and
storing an indication to parse accessibility data received based on messages received via the first messaging client using the second parsing rule.

12. The system of claim 8, the operation further comprising:
receiving accessibility data generated by the operating system based on a second message outputted via a GUI of a second messaging client of the plurality of messaging clients executing on the device;
extracting attributes of the second message from the received accessibility data for the second message and based on a second parsing rule, wherein the attributes comprise a text of the second message, a sender of the second message, and the second messaging client; and
outputting for display an indication of the text of the second message, the sender of the second message, and the second messaging client in the GUI of the integrated messaging application.

13. The system of claim 12, the operation further comprising:
receiving, via the GUI of the integrated messaging application, a third message directed to the sender of the second message;
receiving, via the GUI of the integrated messaging application, input specifying to transmit the third message to the sender of the second message;
receiving accessibility data generated by the operating system based on the third message and the input specifying to transmit the third message;
extracting attributes of the third message from the received accessibility data for the third message and based on the second parsing rule; and
transmitting, by the first messaging client, the third message to the sender of the second message.

14. The system of claim 11, wherein the accessibility data is received from an accessibility application programming interface (API) responsive to an API call generated by the integrated messaging application.

15. A computer program product, comprising:
a computer-readable storage medium having computer-readable program code embodied therewith, the computer-readable program code executable by one or more computer processors to perform an operation comprising:
- transmitting, to an operating system, a request for accessibility data generated by a screen reader within a predefined period of time;
- receiving, responsive to the request, accessibility data generated by the operating system, wherein the accessibility data was generated by the operating system by processing, using the screen reader, a first message outputted via a graphical user interface (GUI) of a first messaging client of a plurality of messaging clients executing on a device comprising the processors, wherein the first messaging client is executing in a background of the device;
- extracting attributes of the first message from the received accessibility data and based on a first parsing rule, wherein the attributes comprise a text of the message, a sender of the message, and the first messaging client; and
- outputting for display an indication of the text of the message, the sender, and the first messaging client in a GUI of an integrated messaging application, wherein the integrated messaging application is executing in a foreground of the device.

16. The computer program product of claim 15, the operation further comprising:
- receiving, via the GUI of the integrated messaging application, a second message directed to the sender of the first message;
- receiving, via the GUI of the integrated messaging application, input specifying to transmit the second message to the sender of the first message;
- receiving accessibility data generated by the operating system based on the second message and the input specifying to transmit the second message;
- extracting attributes of the second message from the received accessibility data for the second message and based on the first parsing rule; and
- transmitting, by the first messaging client, the second message to the sender of the first message.

17. The computer program product of claim 16, the operation further comprising prior to transmitting the second message:
- recreating the second message in the GUI of the first messaging client; and
- causing the first messaging client to transmit the recreated second message to the sender of the first message.

18. The computer program product of claim 15, the operation further comprising:
- determining a format of the accessibility data received based on a second message outputted via the GUI of the first messaging client is different that a format of the accessibility data received based on the first message outputted via the GUI of the first messaging client;
- generating a second parsing rule based on the different format of the accessibility data; and
- storing an indication to parse accessibility data received based on messages received via the first messaging client using the second parsing rule.

19. The computer program product of claim 15, the operation further comprising:
- receiving accessibility data generated by the operating system based on a second message outputted via a GUI of a second messaging client of the plurality of messaging clients executing on the device;
- extracting attributes of the second message from the received accessibility data for the second message and based on a second parsing rule, wherein the attributes comprise a text of the second message, a sender of the second message, and the second messaging client; and
- outputting for display an indication of the text of the second message, the sender of the second message, and the second messaging client in the GUI of the integrated messaging application.

20. The computer program product of claim 19, wherein the accessibility data is received from an accessibility application programming interface (API) responsive to an API call generated by the integrated messaging application, the operation further comprising:
- receiving, via the GUI of the integrated messaging application, a third message directed to the sender of the second message;
- receiving, via the GUI of the integrated messaging application, input specifying to transmit the third message to the sender of the second message;
- receiving accessibility data generated by the operating system based on the third message and the input specifying to transmit the third message;
- extracting attributes of the third message from the received accessibility data for the third message and based on the second parsing rule; and
- transmitting, by the first messaging client, the third message to the sender of the second message.

* * * * *